March 31, 1936.  F. Q. RAST  2,036,081

WEIGHT CONTROLLED MACHINE

Filed July 27, 1933  5 Sheets-Sheet 1

INVENTOR
Frederick Q. Rast
BY
ATTORNEY

March 31, 1936.　　　　　F. Q. RAST　　　　　2,036,081

WEIGHT CONTROLLED MACHINE

Filed July 27, 1933　　　5 Sheets-Sheet 2

INVENTOR
Frederick Q. Rast
BY
ATTORNEY

March 31, 1936.　　　　　F. Q. RAST　　　　　2,036,081
WEIGHT CONTROLLED MACHINE
Filed July 27, 1933　　　5 Sheets-Sheet 3

INVENTOR
Frederick Q. Rast
BY
ATTORNEY

March 31, 1936.  F. Q. RAST  2,036,081
WEIGHT CONTROLLED MACHINE
Filed July 27, 1933   5 Sheets-Sheet 4

INVENTOR
Frederick Q. Rast
BY
W. M. Wilson
ATTORNEY

March 31, 1936.   F. Q. RAST   2,036,081
WEIGHT CONTROLLED MACHINE
Filed July 27, 1933   5 Sheets-Sheet 5

INVENTOR
Frederich Q. Rast
BY
ATTORNEY

Patented Mar. 31, 1936

2,036,081

UNITED STATES PATENT OFFICE 2,036,081

WEIGHT CONTROLLED MACHINE

Frederick Q. Rast, New York, N. Y., assignor to International Business Machines Corporation, New York, N. Y., a corporation of New York Application July 27, 1933, Serial No. 682,413

38 Claims. (Cl. 265—5)

This case relates to weight recording and computing scales.

The object of the invention is to provide novel means for controlling weight recording and computing mechanism for a scale.

Further, the object is to provide novel electrical means for setting recording and computing mechanism in correspondence with the setting of a load operated element.

Still further, the object is to provide means for preventing the setting of the auxiliary mechanism before the load operated element has been definitely positioned.

Another object is to provide continuously operating means for driving the auxiliary mechanism and means for releasing the drive when the auxiliary mechanism arrives at the load point.

Further and other objects and advantages will be hereinafter set forth in the accompanying specification and claims, and shown in the drawings, which by way of illustration show what is now considered to be the preferred embodiment of the invention.

In the drawings:

Fig. 14 is a view taken along lines 14—14 of Fig. 4;

Fig. 15 is a section along 15—15 of Fig. 2;

Fig. 16 is a front view of a modified form of latch for the weight-operated shaft, and, Fig. 17 is a view similar to Fig. 4 of a modified form of lock for the auxiliary mechanism.

The invention is herein disclosed as adapted to weighing mechanism such as shown in Patent No. 1,296,710 although the invention obviously may be used in connection with any other suitable weighing means.

Figure 1:
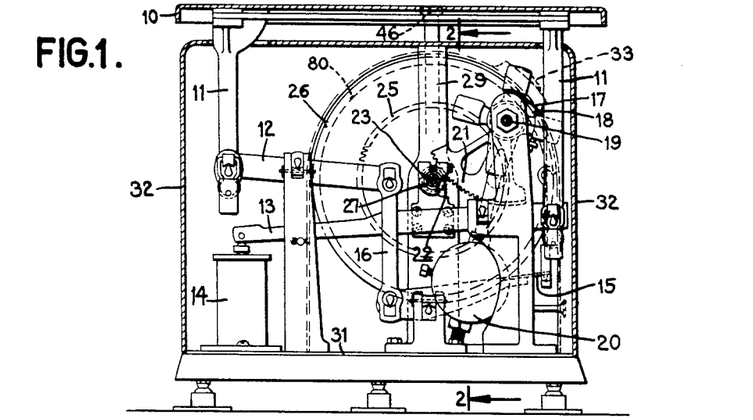
Fig. 1 is a vertical section through the scale.
Figure 2:
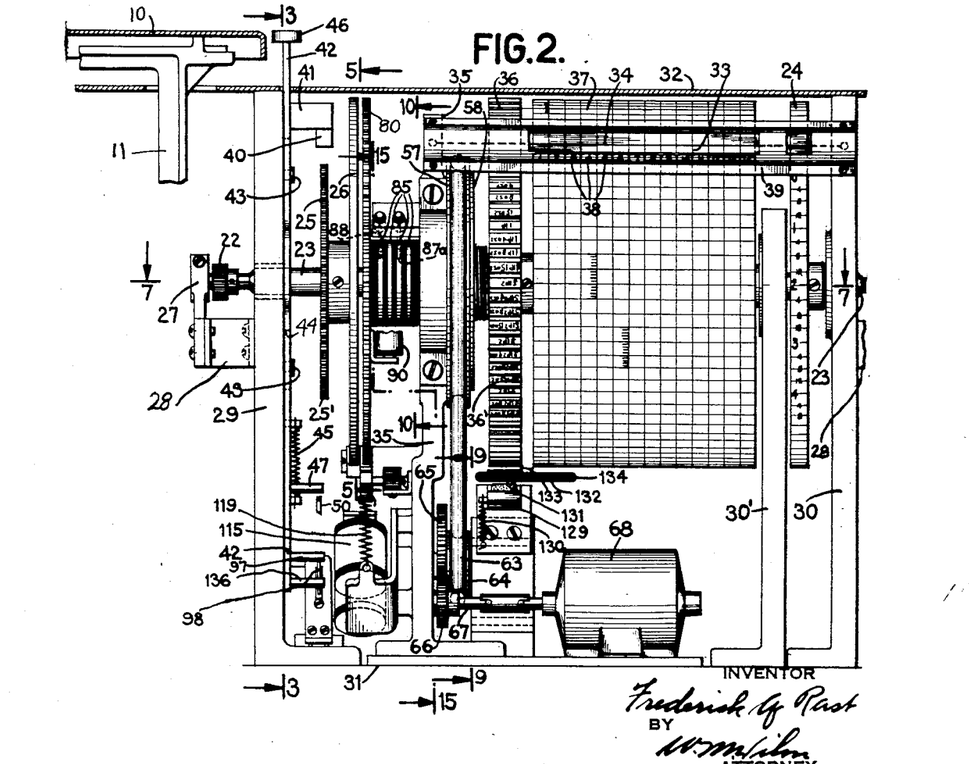
Fig. 2 is a section along lines 2—2 of Fig. 1.
Figure 7:
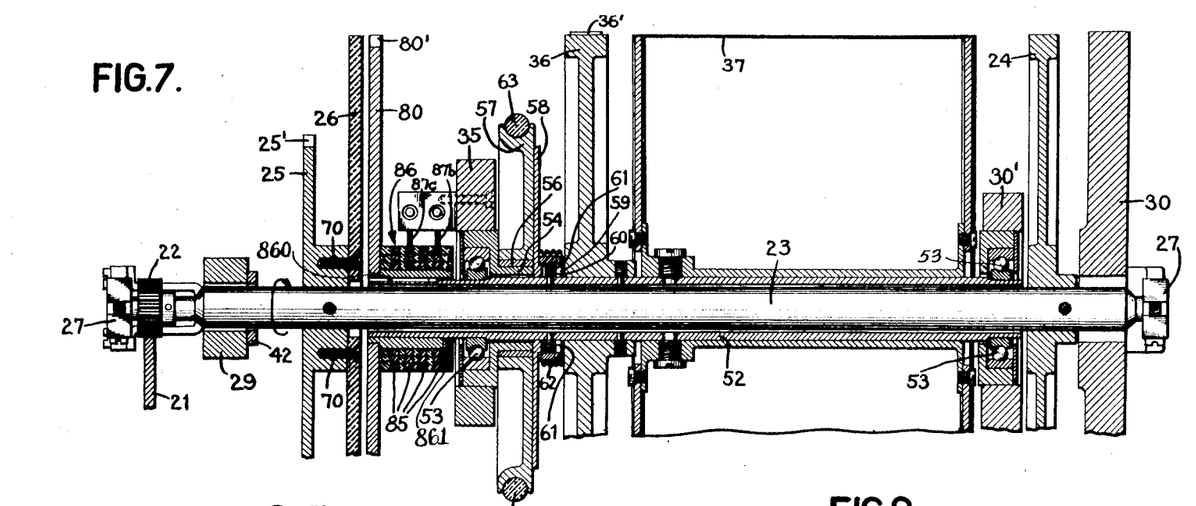
Fig. 7 is a section along line 7—7 of Fig. 2.

Referring to Fig. 1, the scale comprises load platform 10, legs 11 of which connect to first order levers 12 and 13, the latter being connected to dash pot 14. A third lever 15 is coupled by links 16 with levers 12 and 13 to rock with the latter when platform 10 moves. Rocking of lever 15 under a load depresses a connected ribbon 17 to rock eccentric sector 18 on shaft 19 which carries the pendulum 20 and gear 21. The gear 21 meshes with pinion 22 to turn shaft 23 on which are rigidly mounted weight indicating ring chart 24, toothed disk 25, and control disk 26. Referring to Figs. 2 and 7, shaft 23 is journaled at opposite ends in ball bearings 27 carried by bracket 28 secured to the respective front and rear standards 29 and 30 rising from base 31.

Enclosing the entire mechanism is a housing 32 which includes a sight opening for mounting the cylinder lens 33 through which the weight readings of chart 24 are read against index line 34 which extends from an intermediate standard 35 to rear standard 30 and is secured at its ends to said standards.

The operation of the above parts under a load is as follows: The load depresses platform 10 to rock levers 12, 13 and 15. Lever 15 moves clockwise (as viewed in Fig. 1) depressing tape 17 to rock shaft 19, pendulum 20, and rack 21 which through pinion 22 turns shaft 23 and its parts 24, 25, and 26 counterclockwise to load position. When the scale comes to rest, the load is read off from chart 24.

After the weighing operation, auxiliary mechanism must be set under control of disk 26 on shaft 23. This auxiliary mechanism includes a printing wheel 36 having type lugs 36' and a computing means comprising a cylinder or drum chart 37 having parallel, circumferential columns of computations, each column being figured on a different basic factor. The columns are differentiated by basic factor indications 38 (see Fig. 2) marked on a plate 39 visible through lens 33 and secured at opposite ends to standards 30 and 35, each basic factor indication being alined with its corresponding chart column. The chart may be used to indicate values at different prices per pounds, counts of pieces at different unit pan values, or parcel post computations in different zones.

It is desired in the instant case to obtain the weight records and value computations in quarter pound increments. Therefore, the auxiliary mechanism must be controlled by the setting of the weighing mechanism at quarter pound positions.

For the sake of illustration, the capacity of the scale has been taken as twenty pounds so that there are eighty possible desired positions of the weighing mechanism and correspondingly eighty desired positions of the recording wheel 36 and drum chart 37. Accordingly, eighty type lugs 36' are provided on wheel 36 for printing in pounds and ounces at four ounce steps. Each type lug 36' must correspond with a different 4 ounce load position of the weighing mechanism.

It will be brought out hereinafter that recording wheel 36 is moved to a position exactly corresponding to the position of disk 25 of the weighing mechanism. Therefore, if one of the eighty type lugs 36' of wheel 36 is to be in printing position, the disk 25 must first be set in a corresponding one of its eighty quarter pound positions. This means that after the load has moved disk 25 to a load position directly corresponding to the load, the disk 25 must be given an additional movement to locate it at the quarter pound position following the load position. The means for imparting such additional movement to disk 25 will now be described. Disk 25 is formed on its periphery with eighty teeth 25' spaced apart distances equivalent to quarter pound increments of load.

Teeth 25' are sharp-edged and below a similarly sharp-edged wedge tooth 40 which is part of a laterally projecting portion 41 of a push button slide bar 42 guided for vertical slidable movement along the inner side of upright 29 by coaction of headed studs 43 with vertical slots 44 on the bar. The teeth 25' and tooth 40 are inclined at one side in a direction such that when tooth 40 is forced into the space between successive teeth, the tooth 40 will cam the inclined side of a tooth 25' to move the disk 25 in the same direction as it moves under a load. Thus, referring to Fig. 3, the disk 25 is moved counterclockwise by a load and when tooth 40 is moved down into the teeth 25' it engages the inclined side of a tooth 25' to further move the disk 25 counterclockwise. Thus, should the load be 8 pounds 3 ounces, the tooth 40 will move the disk to a position corresponding to 8 pounds 4 ounces. Only when the load is a multiple of four ounces does the tooth 40 fit between successive teeth 25' smoothly without moving the disk 25. Thus, the tooth 40 coacts with teeth 25' to set and latch the disk 25 at an even quarter pound position, of which there are eighty as above explained.

Figure 3:
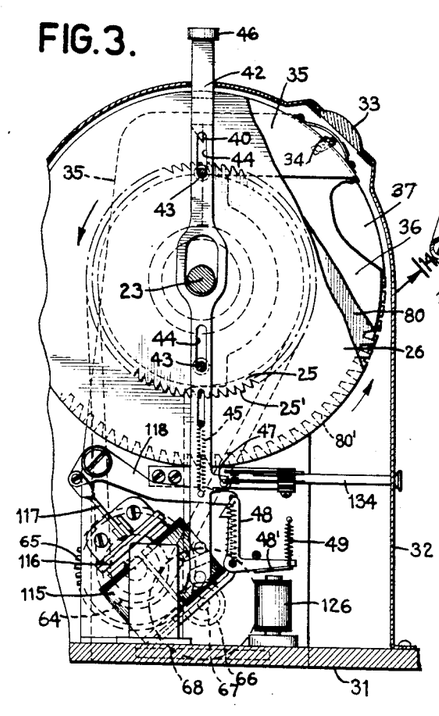
Fig. 3 is a section along lines 3—3 of Fig. 2.

Normally, the slide is held in upper position shown in Figs. 2 and 3, by a spring 45. When the button 46 on the upper end of slide 42 is depressed by the operator against resistance of spring 45, a pin 47 projecting from the slide cams a latch lever 48 clockwise (as viewed in Fig. 6) against the influence of a spring 49 and passes below the latching projection or nose 50 of the lever. The depression of the slide by the operator is limited by the guide studs 43 engaging the upper ends of slots 44. When the operator now releases the slide, spring 45 attempts to lift it but is unable to do so because spring 49 has moved the latch nose 50 of lever 48 above pin 47 and thereby prevents slide 42 from rising at this time.

When the slide 42 has completed its downward movement and has been latched by lever 48, the wedge tooth 40 has completed its entry into a notch between teeth 25' of disk 25 and holds the disk against movement. As disk 25 is set, all the parts of weight shaft 23 to which it is fixed are set. Accordingly, weight chart 24 and control disk 26 are set at an even quarter pound position corresponding to the load.

Figure 8:
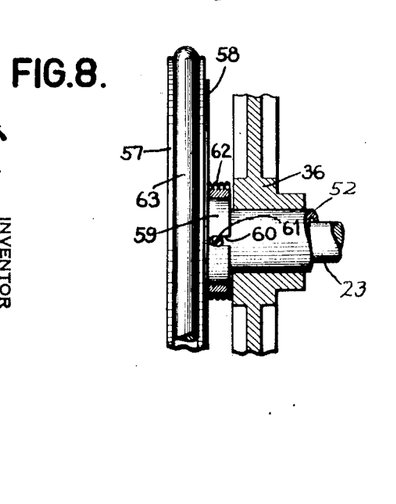
Fig. 8 is a detail of the clutch means for driving the auxiliary mechanism.
Figure 10:
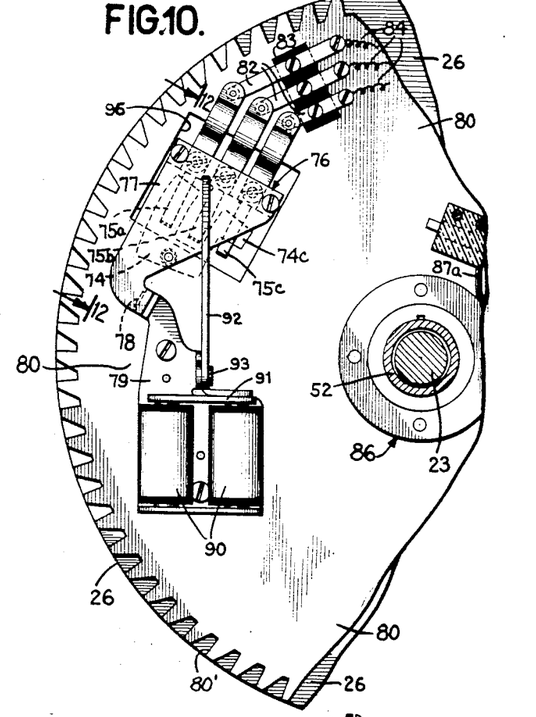
Fig. 10 is a section along line 10—10 of Fig. 2.

Disk 26 is now in position for controlling the setting of the printing wheel 36 and the computing drum chart 37. The printing wheel and the computing chart are rigidly mounted on a sleeve shaft 52 (see Figs. 7, 8, and 10), which surrounds but does not touch weight shaft 23. Sleeve shaft 52 is journaled in spaced ball bearings 53 carried by standards 30' and 35. The left hand bearing 53 (as viewed in Fig. 7) includes a projecting collar 54 embraced by a bronze bushing 56 for journaling a pulley 57. At the right of the pulley (as viewed in Figs. 7 and 8) is a clutch plate 58 the hub 59 of which has slots 60 coacting with pins 61 fast to shaft 52 and by means of which the shaft is connected for rotation with the clutch plate. A coil spring 62 encircling the hub 59 urges the clutch plate into contact with the face of the pulley while axial play for the clutch is allowed by elongated slot 60.

Figure 5:
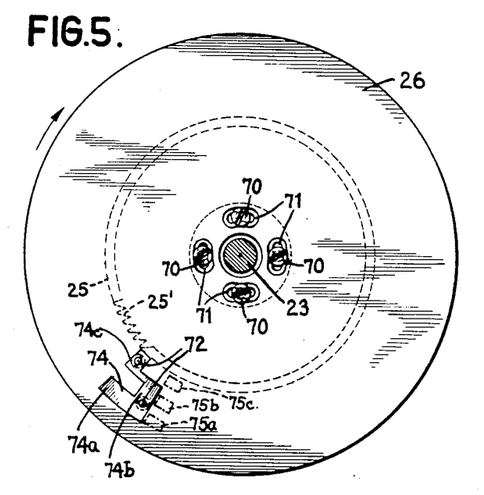
Fig. 5 is a detail view showing the control face of a control disk for the auxiliary mechanism and is a section along line 5—5 of Fig. 2.
Figure 12:
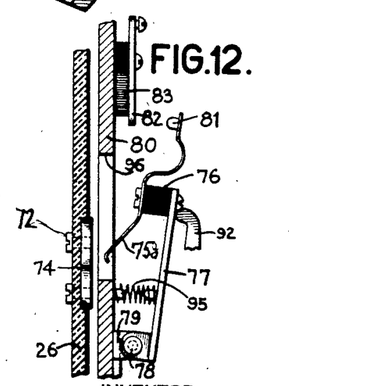
Fig. 12 is a section on line 12—12 of Fig. 10.

Pulley 57 is continuously driven by belt 63 passing around a lower pulley 64 (see Figs. 2 and 3) fast to gear 65 which meshes with pinion 66 on shaft 67 of motor 68. The rotation of pulley 57 through its coaction with clutch plate 58 rotates the sleeve shaft 52 with its printing wheel 36 and computing chart 37. In order to set the printing wheel and computing means under control of disk 26 in accordance with the setting of weight shaft 23, means are provided to stop the driving of the shaft 52 by pulley 57 without however stopping rotation of the pulley. The restraining means of shaft 52 is under control of disk 26 which is of insulating material and is secured to the toothed disk 25 by screws 70 passing through arcuately elongated slots 71 in the plate. The slots permit rotative adjustment of disk 26 to initially locate its zero position in proper relation with the zero position of toothed disk 25 and weight chart 24 as will be further explained. Secured by screws 72 within a properly shaped recess in the face of disk 26 is a contact plate 74 (see Figs. 5 and 12) which may lie either flush with the face of the disk 26 or may protrude to a slight extent as shown in Fig. 12. The contact plate 74 has three branches 74a, 74b, and 74c, which are at different radial distances for a purpose which will presently appear.

Figure 11:
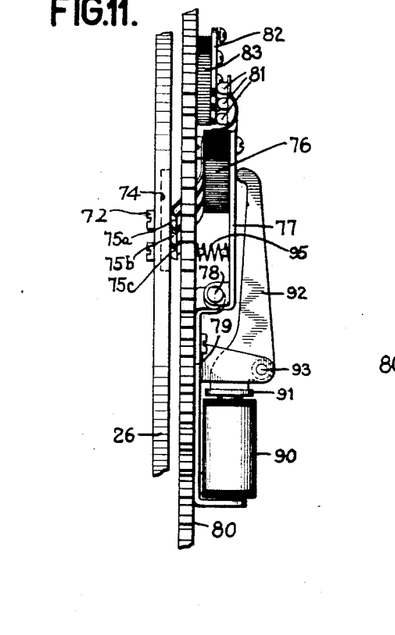
Fig. 11 is an end view of Fig. 10.

Branches 74a, 74b, and 74c are adapted to be wiped by brushes 75a, 75b, and 75c, respectively. These brushes are carried by an insulating block 76 fastened to a carrier 77 which is pivoted by stud 78 to a bracket 79 carried by the right hand face of a toothed disk 80 (as viewed in Fig. 11). The brushes extend outwardly beyond block 76 and have at their outer ends plugs 81 for engaging contact strips 82 fastened through insulating block 83 to disk 80. The three contact strips 82 are connected by conducting wires 84 to three of the commutator rings 85 of the commutator 86 which is rigid with the right side of disk 80 (as viewed in Fig. 7).

Both disk 80 and commutator 86 are keyed to sleeve shaft 52 by key 860 to rotate therewith and are held against longitudinal movement along the shaft by a set screw 861 (see Fig. 7). The three rings 85 are wiped by stationary brushes 87a, 87b, and 87c related respectively to brushes 75a, 75b, and 75c while a fourth ring 85 is wiped by a stationary brush 88.

Mounted on bracket 79 is a magnet 90 wired to the commutator ring 85 which is wiped by brush 88. The magnet coacts with the armature 91 formed at the inner end of a lever 92 pivoted at 93. The upper end of lever 92 is in contact with pivoted arm 77. Normally a spring 95 holds the arm 77 and thereby holds lever 92 furthest away from the face of disk 80. In this position of arm 77, feelers or brushes 75a, movable therewith are in retracted position within a hole 96 in disk 80 and entirely free of contact with control disk 26. When magnet 90 is energized, it attracts arm 91 to rock lever 92 and thereby arm 77 counterclockwise, as viewed in Fig. 11, moving brushes 75a, 75b and 75c into engagement with the face of disk 26. The brushes 75 are of flat spring material and curved at their contact ends to wipe the face of disk 26 with spring pressure. When feeler 75c begins to engage contact branch 74c, then the zero position of disk 80 and that of disk 26 coincide. Since the zero position of disk 26 must correspond with that of weight chart 24, the disk 26 is preliminarily adjusted by means of aforesaid adjustable screw and slot connection 70—71 to bring the right hand edge of contact branch 74c (as viewed in Fig. 5) in line with the contact end of brush 75c when the weight chart 24 stands at zero.

Magnet 90 is operated under control of push button slide 42. When the latter is depressed to set the weight operated control parts 25 and 26, a stud 97 (see Fig. 6) adjacent the lower end of slide 42 rocks the switch lever 98 of a snap switch downwardly to close switch contacts 99.

Figure 13:
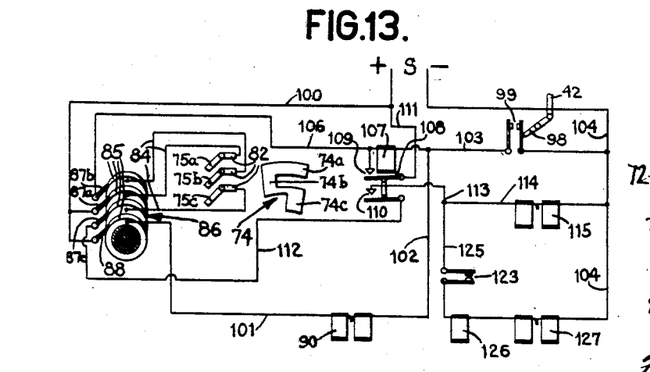
Fig. 13 is the circuit diagram.

Referring to the circuit diagram, Fig. 13, closing of contacts 99 completes a circuit through magnet 90 as follows: From the + terminal of the power source S through line 100, brush 88, its commutator ring 85, line 101, magnet 90, line 102, line 103, snap switch contacts 99, and line 104, to the — terminal of source S.

Energization of magnet 90 by above circuit places brushes 75 in contact with the face of disk 26. It may happen that as the toothed disk 80 carrying brushes 75 is rotating, the latter will be opposite contact plate 74 of disk 26 when magnet 90 is energized to engage the brushes with the contact plate. This engagement may take place before disk 26 is completely set at the proper four ounce point by coaction of latch 40 with toothed disk 25. Engagement of brushes 75 with plate 74 controls the stopping of auxiliary shaft 52 and it is not desirable to stop this shaft in a position which does not correctly correspond to the fully set position of disk 26 and its weight shaft 23.

Accordingly provision for a time lag between the operation of setting the disk 26 and the effective control by brushes 75 and plate 74 is desirable and this is the reason for the peculiar formation of plate 74 and its division into three branches to coact with three different brushes. The manner in which branches 74a, 74b, and 74c coact with brushes 75a, 75b, and 75c, to control stopping of the shaft 52 only after the disk 26 is completely set is as follows:

Assuming brushes 75 are wiping the face of control disk 26, the rotation of the brushes is clockwise (as viewed in Figs. 5 and 10) and brushes 75a and 75b first engage their contact parts 74a and 74b. After brush 75b leaves part 74b, brush 75c engages contact 74c. The circumferential gap between the disengagement of brush 75a and engagement of brush 75b is made equal to slightly more than a tooth space of disk 80.

The time it takes disk 80 to move through about a tooth space is found sufficient for latch tooth 40 to completely set disks 25 and 26. There is thus a lapse of time between the disengagement of brush 75b and contact 74b and the coaction of brush 75c with contact 74c. Should the brushes 75 be moved in contact with plate 26 with brush 75b coming within the clear circumferential gap between contacts 74b and 74c, then the control for stopping shaft 52 will not operate and disk 80 must make another revolution by which time the disk 26 will have been completely set. Only if brush 75b first engages contact 74b before brush 75c engages contact 74c will the control of shaft 52 be effective to stop it. This allows a minimum time equal to about the time of rotation of disk 80 through one tooth distance for disk 26 to be set before shaft 52 can be stopped. In this way, shaft 52 is set in a position which exactly corresponds to the finally set position of disk 26.

The manner in which brushes 75 and contact 74 coact to control stopping of shaft 52 will now be explained.

Assume the load has been placed on the scale and chart 24 came to rest. The operator then depresses head 46 of slide 42 to depress the slide, thereby forcing the latch tooth 40 into engagement with teeth 25' of disk 25 to set the latter and disk 26 in correct load position. Depression of slide 42, through pin 97, operates switch lever 98 to close contacts 99, and energize magnet 90. The latter thereupon moves the brushes 75 into contact with the face of disk 26. Assume that the brushes are contacting the disk 26 in advance of the contact plate 74. As the disk 80 is rotated clockwise (as viewed in Fig. 10) by pulley 57 and clutch plate 58, brushes 75a and 75b first simultaneously engage contact parts 74a and 74b while brush 75c is still riding on the insulated face of disk 26. Referring to the circuit diagram (Fig. 13) when brushes 75a and 75b engage contacts 74a and 74b, the following circuit is formed:

From the + terminal of source S through line 100, brush 87a, its commutator ring 85, connected lead 84 and strip 82, through brush 75a, contact branch 74a, contact branch 74b, brush 75b, its connected strip 82, lead 84, and commutator 85, brush 87b, line 106, relay 107, line 103, closed snap switch contacts 99, and line 104 to the — terminal. Relay 107 is energized by this circuit to attract its armature 108 to thereby close contact pairs 109 and 110. Contacts 109 when closed form a holding circuit for relay 107 which is from the + terminal through line 111, contacts 109, relay 107, line 103, contacts 99, and line 104 to — terminal. The relay 107 therefore remains energized to hold contacts 110 closed although rotation of disk 80 has separated brush 75b from contact branch 74b. A short interval after brush 75b leaves its contact, brush 75c engages contact 74c to close a circuit which includes in series the contacts 110 now closed by relay 107. This circuit is as follows:

From the + terminal, through line 100, brush 87a, commutator 85, brush 75a, contact branch 74a, branch 74c, brush 75c commutator 85, brush 87c, line 112, contacts 110, terminal 113, line 114, magnet 115 (which operates to stop shaft 52) and line 104 to the — terminal.

It will now be clear why brush 75b must engage its contact before engagement of brush 75c with contact 74c in order to effect a control operation. If brush 75b has not been engaged with contact 74b, relay 107 will not have been energized and contacts 110 will be open thus preventing formation of the circuit just described for energizing magnet 115.

Figure 4:
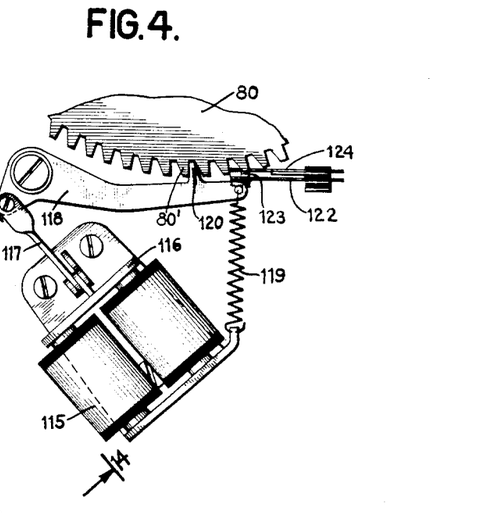
Fig. 4 is an enlarged detail of a part of Fig. 3 showing the latching means for the auxiliary mechanism.

Magnet 115 operates to stop rotation of the shaft 52 as follows: When energized by above circuit, magnet 115 attracts armature 116 which through link 117 rocks lever 118 counterclockwise (as viewed in Fig. 4) against resistance of spring 119. A latch tooth 120 on lever 118 thereupon moves into the space between a pair of teeth 80' of disk 80 and stops the latter from further rotation, clutch plate 58 thereafter slipping on the clutch face of still rotating pulley 57. There are eighty teeth 80', one for each tooth 25' and each printing lug 36' and latch tooth 120 stops the disk 70 in one of its eighty positions corresponding to the position of disks 25 and 26 and weight shaft 23. The disk is stopped when brush 75c engages branch 74c. Since branch 74c is at the zero position of disk 26, disk 80 is therefore stopped when it reaches a position coinciding with the zero position of the disk 26 and of the weighing mechanism operating the latter disk. Thus, if the zero position of disk 26 has moved from home position a distance equivalent to three pounds, twelve ounces, then disk 80 will be stopped by latch tooth 120 at a corresponding three pound, twelve ounce position. Since disk 80 is fast to shaft 52 all parts of the shaft will also be set in accordance with the setting of the disk 26 and weighing mechanism. This means that the computing chart 37 will disclose through lens 33 against index 34 figures in each column which have the weight three pounds, twelve ounces as a common multiplicand. Correspondingly, printing wheel 36 will have a type lug 36' at the printing position which will bear thereon the legend 3 lbs. 12 ozs.

The printing by this type lug of a record is initiated only after the disk 80 has been completely stopped by the latch tooth 120. This is accomplished by placing the printing operation under control of lever 118. The free end of the latter is beneath a spring blade 122 which has one of a pair of contacts 123, the other of which is on a blade 124. When the lever 118 completes latching of disk 80, its free end has succeeded in moving blade 122 sufficiently to close contacts 123. These contacts are in the circuit for causing printing. This circuit, referring to Fig. 13 is in parallel with the circuit through magnet 115 which has been described above. Continuing in the latter circuit from terminal 113, the parallel circuit is through line 125, contacts 123, magnet 126, solenoid 127, and line 104 to the — terminal.

Figure 9:
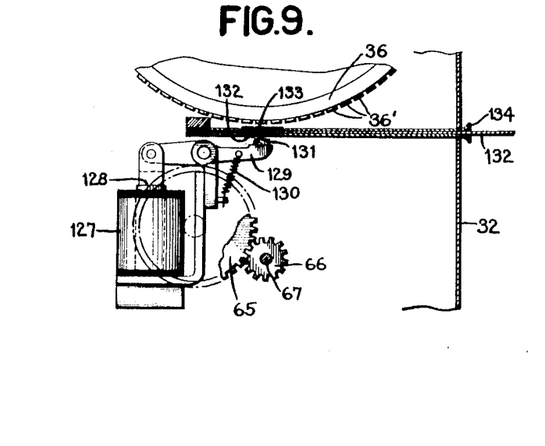
Fig. 9 is a detail of the printing mechanism taken along line 9—9 of Fig. 2.

Solenoid 127 when energized effects printing referring to Fig. 9, by attracting its core 128 to rock lever 129 against resistance of spring 130 thereby forcing hammer 131 on lever 129 to press the card 132 against inking ribbon 133 and type lug 36' at printing position and cause a record of the load to be printed on the card. The card is inserted by the operator into a card chute 134 opening outside housing 32.

Figure 6:
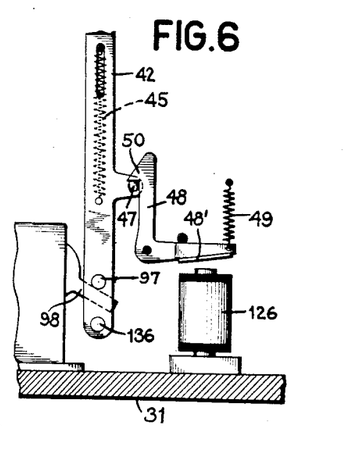
Fig. 6 is a detail view of the latching means for the push button which sets the weight control means of the auxiliary mechanism.

Magnet 126 energized simultaneously with solenoid 127 effects release of latch lever 48 from push button slide 42. Referring to Fig. 6, magnet 126 attracts armature 48' formed on lever 48 to rock the latch nose 50 away from pin 47 on slide 42, thereby permitting spring 45 to return the slide to upper and initial position in which tooth 40 has released disk 25 and the weighing mechanism is therefore free to move under a new load. As slide 42 rises, a pin 136 at its lower end engages switch lever 98 to rock it upwardly and open contacts 99. The opening of these contacts opens the circuits through relay 107, its contacts 110 break, and the circuits through magnets 90, 115, and 126 and solenoid 127 are thereby opened.

To prevent any possibility of switch contacts 99 opening to deenergize solenoid 127 before printing is completed, pin 136 is spaced from switch lever 98 so that a certain time lag is provided after energization of magnet 126 to release slide 42 before pin 136 functions to operate lever 98 and open contacts 99. Thus, solenoid 127 is given sufficient time to effect complete printing operation before being deenergized by opening of contacts 99.

Deenergization of magnet 90 withdraws brushes 75 from disk 26; deenergization of magnet 115 releases latch lever 118 from disk 80 permitting the latter to rotate with pulley 57. The parts are now set for another weighing, recording, and computing chart operation.

A brief summary of the operation follows:

A load placed on platform 10 moves lever 15 to rock pendulum 20 and turn shaft 23. Weight chart 24 and disks 25 and 26 on shaft 23 are thus positioned in accordance with the load. The operator now presses on head 46 of slide 42 and depresses the latter until latch 50 hooks over pin 47 on the slide and retains it in depressed position. In moving down, tooth 40 in the slide enters between teeth 25' of disk 25 and sets the latter at an even quarter pound position. Disk 26 fixed to disk 25 is also set correspondingly. When slide 42 was depressed, pin 97 thereon operated lever 98 to close snap switch contacts 99. This results in energization of magnet 90 on the toothed disk 80 of auxiliary shaft 52 which is releasably rotated by pulley 57. Magnet 90 thereupon moves brushes 75 movably carried by disk 89 into contact with disk 26. When brushes 75a and 75b engage contact branches 74a and 74b on the disk, a circuit is closed through a relay 107 which causes contacts 110 to make. After brush 75b leaves its contact branch, brush 75c engages contact branch 74c to close a circuit passing through contacts 110 which energizes magnet 115.

Magnet 115 operates lever 118 to stop disk 80 at a point corresponding to the load setting of disk 26, clutch plate 58 slipping on the clutch face of pulley 57. When disk 80 is stopped, shaft 52 and its printing and value computing mechanism also stops. Lever 118 which latches the disk 80 closes contacts 123 to cause energization of solenoid 127 which causes the operation of printing hammer 131 to effect printing on card 132 from the type lug 36' at printing position to record the load readable from weight chart 24.

A value may be read now from any column of chart 37. This value may be the postage cost of the weighed package in any of the various postal zones corresponding to the different columns.

While the auxiliary mechanism is settable only to quarter pound positions, the operation of the weighing mechanism none the less must be accurate, in fact, more than usually accurate. This is because the apexes of the teeth 25 which are between successive quarter pound positions are critical points and disk 25 must accurately move to accurately locate the critical points. Should disk 25 be incorrectly set under the load as much as $\tfrac{1}{16}$ of an ounce, the setting of the disk 25 by latch tooth 40 may result in an error of four ounces. For example, if the correct load is 1 pound and the weighing mechanism inaccurately takes a position corresponding to 1 pound 1/16 ounce, then tooth 40 will be past the 1 pound tooth 25' and when it moves into latching engagement will shift the disk 25 to a 1 pound 4 ounce position. Similarly, if the load is 1 pound 3½ ounce and the disk 25 inaccurately moves under the load to a position corresponding to 3¼ ounce, the disk will be set by tooth 40 at a 1 pound position whereas it is desired to set it at the 1 pound 4 ounce position as would be necessary in obtaining parcel post charges.

It is therefore evident that the accuracy of the scale must be greater than usual because inaccurate positions of the critical points of disk 25 will greatly magnify the error when the disk is set to control the auxiliary mechanism.

By mounting the auxiliary mechanism separately from the weighing mechanism and operating it independently of but under control of the latter, the auxiliary mechanism has no reactive effect on the weighing mechanism. The weighing operation is therefore accurate since it need result only in setting the weighing mechanism and not the auxiliary mechanism. The less the weight of the parts to be moved by the load the more accurate is the load weighing operation. This is because the inertia and friction of the parts increase in proportion to the weight of the parts. Inertia and friction prevent movement of the parts under a small load and failure of 1/16 ounce increment of load to move the parts may be fatal. Similarly, the greater the weight of the load operated parts, the greater their momentum and their tendency to move beyond true position. Accuracy of a scale thus increases as the weight of parts moved by the load decreases. For these reasons, a scale in which auxiliary recording or computing mechanism is directly moved by the load is impractical. By separately mounting and operating the auxiliary mechanism, as in the present invention, a practical weighing, recording, and computing scale results.

It is understood that instead of the scale being of twenty pound capacity, it may be of any other capacity such as 80 pounds, in which case, type lugs 36' will print the load in pound increments and chart 37 will compute the values in pound steps.

Figures 14, 15, 16, 17:
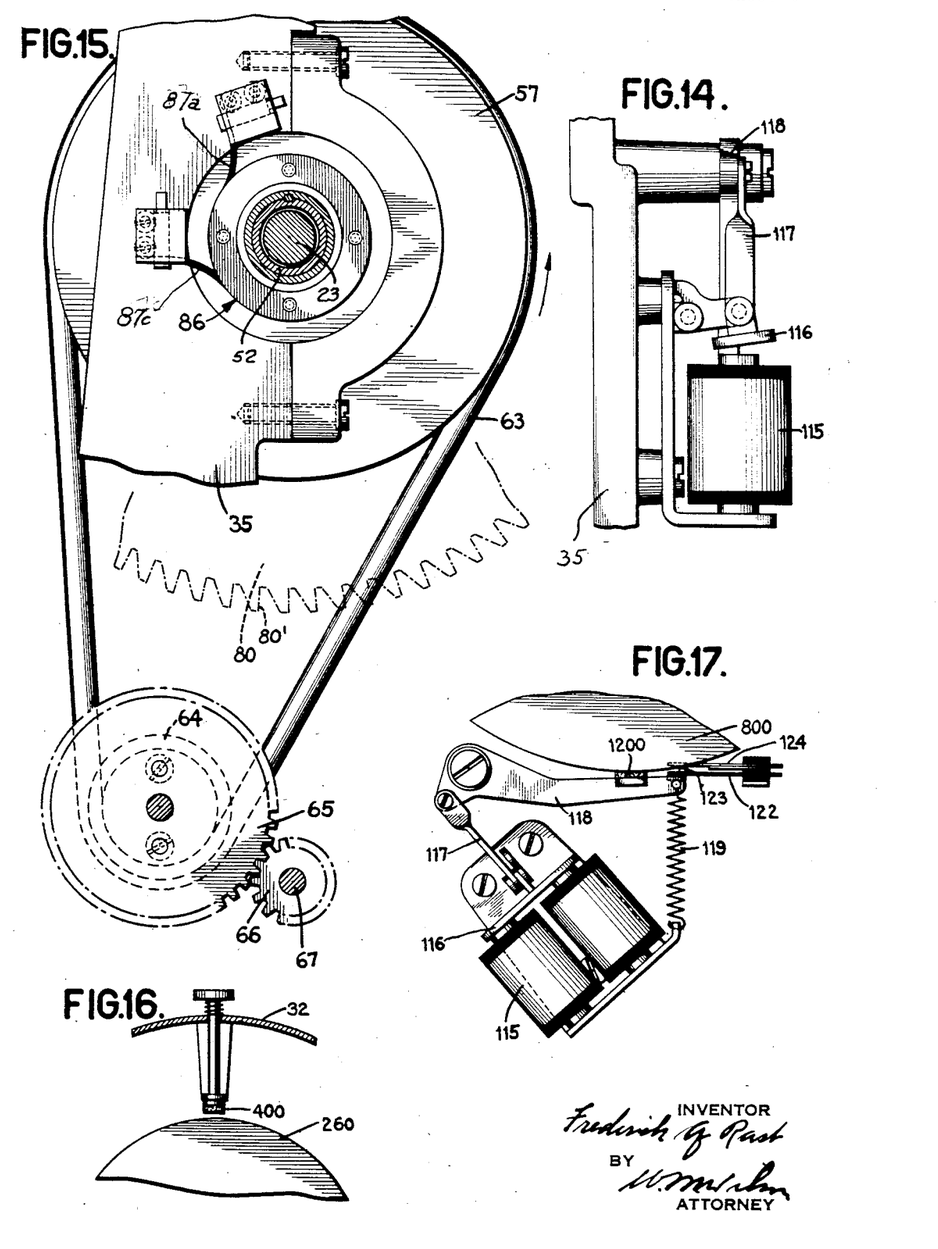

It will also be understood that a friction brake latch 400 may be used instead of tooth 40 to coact with a smooth disk 260 which may replace toothed disk 25 as shown in Fig. 16 and in this manner, the weight shaft will be set at the exact load point. Similarly, the tooth 120 may be replaced by a friction brake 1200 to stop a smooth disk 800 and the auxiliary mechanism at the exact load point, as shown in Fig. 17. The computing chart 37 will then indicate the values at the exact load point and the weight may also be printed within close limits.

While the invention has been disclosed as embodied in the forms shown in the drawings and described in the specification, it is understood that various modifications, substitutions, and changes within the spirit of the invention may be made without departing from the same. I therefore wish to be limited only by the scope of the following claims:

I claim:

1. In a machine provided with load weighing mechanism and auxiliary mechanism; the combination of a pair of control elements, one differentially movable by the weighing mechanism and the other continuously movable by the auxiliary mechanism in adjacent but normally spaced paths, means for bringing the paths into coincidence to thereby cause the members while moving relatively in the coincident paths to interengage at a differential point of said coincident paths, and a device controlled by engagement of the control members to set the auxiliary mechanism differentially in accordance with the differential point of engagement of said members.

2. In a machine provided with load weighing mechanism and auxiliary mechanism; the combination of a pair of rotary control members movable differentially from zero positions in arcuate, adjacent but normally spaced paths, one being moved by the weighing mechanism and the other being continuously movable by the auxiliary mechanism, means for bringing the paths into coincidence to thereby cause the members while rotating relatively in the coincident paths to interengage at a differential point of said coincident arcuate paths, and a device operated by interengagement of said members to control the operation of the auxiliary mechanism in accordance with the length of arc of said coincident arcuate paths between zero positions of the members and the engagement point of the members.

3. In a machine provided with load weighing mechanism and auxiliary mechanism; the combination of a control member differentially movable to different load points of its path by operation of the weighing mechanism, a second control member normally, continuously movable in a path adjacent but normally spaced from the first-mentioned path, means for bringing the paths into coincidence, an actuator for moving the second member prior to operation of said means continuously along the spaced path and for moving it after operation of aforesaid means along the coincident paths to engage the first member, and a device automatically controlled by the engagement of the members to set the auxiliary mechanism differentially in accordance with the load point to which the first member has been moved by the weighing mechanism.

4. In a machine having load weighing mechanism and auxiliary mechanism; an intercontrol between the mechanisms comprising a first control member set by the weighing mechanism in accordance with the load, a second control member for governing operation of the auxiliary mechanism and movable in a path adjacent but normally spaced from the path of the first member, means for bringing the paths into coincidence, an actuator for moving the second member along its spaced path during the weighing operation and for moving the second member, after the load setting of the first member differentially along the coincident paths until the second member engages the first member at a point in the coincident paths corresponding to the load, and a device controlled by engagement of the members to release the second member from the actuator and arrest it at aforesaid point to correspondingly control the auxiliary mechanism.

5. In a machine having load weighing mechanism and auxiliary mechanism: the combination of a first control member settable by the weighing mechanism in accordance with the load, means for locking the first control member in load set position, a second control member continuously movable in a path adjacent but normally spaced from the path of movement of the first control member, means controlled by operation of the locking means for bringing the paths into coincidence, and an actuator for moving the second member along the coincident paths to sense the position of the first member and control the auxiliary mechanism accordingly.

6. In a machine having load weighing mechanism and auxiliary mechanism; the combination of a first control member primarily settable by the weighing mechanism, means for effecting a secondary setting of the first control member, a second control member for governing operation of the auxiliary mechanism and located during the weighing operation outside the path of movement of the first member, means controlled by operation of the secondary setting means to move the second member to a path which includes the first control member, and an actuator for moving the second member variable distances along the latter path to sense the position of the first member and control the auxiliary mechanism accordingly.

7. In a machine having load weighing mechanism and auxiliary mechanism; the combination of a first control member primarily settable by the weighing mechanism in accordance with the load, means for effecting a secondary setting of the first member, a second control member, an actuator for moving the second member to sense the position of the first member by engaging the latter, a device controlled for operation by engagement of the members, means for preventing said device from being controlled by the engagement of said members unless a minimum lag between operation of the secondary setting means and engagement of the members has occurred, and means controlled by operation of the device upon engagement of said members for setting the auxiliary mechanism in accordance with the load.

8. In a machine including load weighing mechanism, auxiliary mechanism, and a motor drive for releasably operating the auxiliary mechanism; the combination of a first control member settable by the weighing mechanism in accordance with the load, a second control member for sensing the position of the first member, a toothed disk connected to the auxiliary mechanism, and a pawl controlled by the members for automatic operation upon the second member sensing the position of the first member to engage the toothed disk and arrest it and the auxiliary mechanism connected therewith to thereby set the auxiliary mechanism in a position corresponding to the load.

9. In a machine including weighing mechanism and auxiliary mechanism; the combination of a first control member differentially settable by the weighing mechanism in accordance with the load, a second control member for governing operation of the auxiliary mechanism and movable in one direction only in a path adjacent but normally spaced from the path of movement of the first member, an actuator for releasably driving the second member continuously in one direction during the weighing operation, means for bringing the paths into coincidence after the weighing operation to cause the second member to engage the first member while the second member is continuing to move in aforesaid direction, means controlled by engagement of said members for arresting the movement of the second member to govern operation of the auxiliary mechanism accordingly, and a device subsequently operable for releasing the arresting means to automatically cause the second member to resume its movement in aforesaid direction.

10. In a machine including weighing mechanism and auxiliary mechanism; the combination of a first control member settable by the weighing mechanism, a second control member for governing operation of the auxiliary mechanism, an actuator, a friction clutch driving connection between the actuator and second member to move the latter in one direction only in a path including therein the first member to thereby engage the first member for sensing its position, means controlled by the engagement of the members to cause slipping of the friction clutch connection by arresting the second member at the point of its engagement with the first member to govern operation of the auxiliary mechanism accordingly, and a device subsequently operable for releasing the arresting means to cause the friction clutch connecton to resume the driving of the second member in aforesaid direction from the point at which it had been arrested.

11. In a machine including weighing mechanism and auxiliary mechanism; the combination of a first control member settable by the weighing mechanism, a second control member for governing operation of the auxiliary mechanism, an actuator, a releasable drive connection between the actuator and the second member for moving the latter differentially in a path for sensing the position of the first member, a toothed disk rigidly connected to the second member, and a device controlled by engagement of the members for coacting with the teeth of said disk to release said drive connection and arrest the second member in a position in its path corresponding to the load for governing operation of the auxiliary mechanism accordingly.

12. In a machine including weighing mechanism and an auxiliary device; the combination of a first control member primarily settable by the weighing mechanism, manual means for secondarily setting the first control member, a second control member normally out of cooperation with the first member, means controlled by operation of the manual means for rendering the second member effective for cooperating with the first member to sense the setting of the latter, mechanism controlled by the cooperation of the members for governing operation of the auxiliary device, and means for preventing operation of the latter mechanism until a predetermined minimum time has elapsed between operation of the manual means and the sensing of the first by the second member.

13. In a machine including load weighing mechanism for operating a rotatable shaft and auxiliary mechanism; the combination of a control member secured relative to said shaft and movable therewith to the load point, means for sensing the position of the control member, a mounting for the sensing means comprising a second shaft in telescoping relation to the first-mentioned shaft, a device for moving the sensing means longitudinally of the common axis of said shafts to cause the sensing means to move with the second shaft in a path for sensing the position of the control member, and means controlled by the sensing of the control member to operate the auxiliary mechanism in accordance with the load.

14. In a machine including load weighing mechanism for rotating a shaft, and auxiliary mechanism; the combination of a control member secured relative to said shaft to be set in accordance with the load, means for sensing the position of the control member, a mounting therefor including a second shaft connected to the auxiliary mechanism and in telescoping relation to the first-mentioned shaft, a toothed disk fast to the second shaft, an actuator for releasably rotating the second shaft to cause the sensing means to find the position of the control member, and a pawl controlled by the sensing of the control member to engage the teeth of said disk and arrest the second shaft in a position corresponding to the position of the first-mentioned shaft while the actuator continues its movement.

15. In a machine in which weighing mechanism and auxiliary mechanism are provided; a toothed disk and connected control element commonly settable by the weighing mechanism, a device for coacting with the teeth of said disk to lock the disk and control element in position, a second toothed disk operated by the auxiliary mechanism and having a second control element to sense the position of the first element, a latch, and means controlled by said elements upon coaction of said elements for operating the latch to engage the teeth of the second disk and arrest it in a position corresponding to that of the first element.

16. In a machine including weighing mechanism, an auxiliary device, and an actuator for releasably driving the auxiliary device; the combination of a disk operated by the weighing mechanism and having a contact in one face at an index position, a second disk driven by said actuator and having a toothed periphery and carrying a feeler to wipe said face of the disk to engage the contact during its movement, a latch, and means controlled by engagement of the feeler with the contact for moving the latch to cooperate with the toothed periphery of the disk for arresting the latter and releasing the actuator from the auxiliary device.

17. In a machine in which weighing and auxiliary mechanisms are provided; the combination of two contact elements, one movable by the weighing mechanism in accordance with the load and the other by the auxiliary mechanism in adjacent but normally spaced paths, means for bringing the paths into coincidence to thereby cause the contacts while moving relatively in the coincident path to engage each other, a circuit controlled by engagement of the contact elements, and a device operated by the circuit for governing operation of the auxiliary mechanism in accordance with the load.

18. In a machine including load weighing mechanism and auxiliary mechanism; a member operated by the weighing mechanism to a position corresponding to the load, a contact plate carried by said member and having two elements one at the load position and the other in advance of and spaced from the load position, means for sensing the position of the contact plate, an actuator for moving the sensing means along the path of said member to find the position of the contact plate, a device controlled by the sensing means, means for preventing control of said device by the sensing means unless the latter senses the advance element prior to sensing the element at the load position, and means controlled by operation of said device for positioning the auxiliary mechanism.

19. In a machine including load weighing mechanism and auxiliary recording mechanism; the combination of a first control member operated by the weighing mechanism in accordance with the load, a second control member, an actuator for releasably driving the auxiliary mechanism and for operating the second member to sense the position of the first member, a device controlled by the sensing of the first member to release the auxiliary mechanism from the actuator and setting the auxiliary mechanism in a position corresponding to the load, and means controlled by operation of said device for effecting a recording operation by the set auxiliary mechanism.

20. In a machine including load weighing mechanism and auxiliary mechanism; the combination of a first contact member primarily settable by the weighing mechanism at the load point, manual means for locking the first member and in so doing effecting a secondary setting of the first member at an even weight position, a second contact member normally within a plane spaced from the path of movement of the first member, a movable mounting for the second member, a magnet carried by the mounting, means operated by the magnet for moving the second control member into a second plane in which it is within the path of the first member, a circuit for the magnet closed by operation of the manual setting means, an actuator for moving the second member differentially along said second plane to a point thereof corresponding to the setting of the first member at which point it engages the first member, a circuit completed by engagement of said members, and a device operated by the circuit for setting the auxiliary mechanism in accordance with the position of the first member.

21. Means for setting a member according to the position of a control element responsive to load weighing mechanism; comprising means for primarily setting the control element according to the load, means for effecting a secondary setting of the control element supplementary to the load setting of the element, an actuator, a friction driving connection between the actuator and aforesaid member for moving the member in one direction, means controlled by operation of the secondary setting means to cause the actuator to drive the member along a path including therein the control element to sense the position of the latter, a device controlled by coaction of the member and element upon the sensing of the element by the member for arresting the member and causing the friction driving connection to slip without moving the member, and means subsequently operable for releasing the device from the member so that the friction driving connection resumes driving of the member in aforesaid direction.

22. Means for setting a member according to the position of a control element directly responsive to load weighing mechanism; comprising driving means for said member, a manual control instrumentality, means controlled by operation of said instrumentality for causing said member to be driven by the driving means along a path for sensing the position of said control element, means set in operation by the sensing of the element by the member while moving in said path for automatically and positively arresting the actuation of said member by said driving means to thereby set the member in a position corresponding to that of the control element, and means subsequently operable to release said member from the arresting means and permit the actuator to resume the driving of said member and to withdraw the member from its set position.

23. Means for setting a member according to the position of a control element responsive to load weighing mechanism; comprising driving means for said member, a manual control instrumentality, means controlled by said instrumentality for causing the member to be driven by said driving means along a path for sensing the position of the control element, a device connected to said member for movement synchronously therewith, an electrical circuit controlled by the sensing of the element by the member while moving along said path, and automatic means set in operation under control of said circuit when the member senses said element for engaging said device to arrest the movement of said device in a position corresponding to that of the control element.

24. The invention as defined in claim 23 including means for retaining the manual control instrumentality in its operated position, and means operable subsequent to the arrest of said device for releasing said instrumentality from the retaining means.

25. The invention as defined in claim 23, aforesaid device comprising a toothed element and said arresting means comprising a pawl for engaging the toothed element to cause the arrest of said device.

26. The invention as defined in claim 23; said driving means having a frictional driving connection to said device and the arrest of said device causing said frictional driving connection to slip without moving said device.

27. In a machine including load weighing and auxiliary mechanism; the combination of a control device including a pair of control elements responsive to operation of the weighing mechanism, one of said elements assuming a load position and the other element assuming a position in advance of the load position, a sensing device movable in a path for sensing the control elements in succession, means controlled by the sensing of the element at the load position by the sensing device for governing operation of the auxiliary mechanism according to said load position, and means for rendering the first-mentioned means ineffective unless the sensing device senses the element which is in advance of the load position before it senses the element at the load position.

28. In a machine including load weighing mechanism and auxiliary mechanism; the combination of control means responsive to operation of the weighing mechanism and including a first, electrical, control element set in a load position and a second, electrical control element in advance of the first control element, an electrical control device for successively sensing the control elements while the latter are stationary, an electrical circuit set up by the sensing of the second element by the control device, and another electrical circuit controlled by the first-mentioned circuit and by the sensing of the first element by the control device for governing operation of the auxiliary mechanism according to said load position.

29. In a machine including load weighing mechanism having a certain range; the combination of auxiliary mechanism having a corresponding range within which it may be set at different load points, an impositive drive for actuating said auxiliary mechanism along its range, means movable with the auxiliary mechanism for sensing the position of the weighing mechanism under a load, and a detent automatically set in operation upon the sensing means sensing the weighing mechanism position for positively engaging the auxiliary mechanism to arrest directly by such engagement the movement of the auxiliary mechanism by said drive at a point within the range of the latter mechanism corresponding to the load.

30. In a machine including a load weighing mechanism having a certain range; the combination of auxiliary mechanism having a corresponding range within which it may be set at different load points, a friction drive for moving said auxiliary mechanism along its range, and means automatically controlled by said weighing mechanism when said auxiliary mechanism reaches a load point corresponding to the position of the weighing mechanism for arresting the actuation of the auxiliary mechanism by said friction drive while allowing the latter to continue moving.

31. The machine as defined in claim 30, and means for subsequently releasing the auxiliary means from said arresting means to cause the friction drive to resume actuation of the auxiliary mechanism.

32. In a machine including auxiliary mechanism and load weighing mechanism; the combination of a first control member forming a part of the weighing mechanism and directly settable by the weighing mechanism in response to the load, a second control member for governing operation of the auxiliary mechanism, an actuator, a friction clutch driving connection between the actuator and the second member to move the latter along a path for sensing the position of the first control member, and means other than the first control member set in operation by the sensing of the first control member by the second member for arresting the second member in a position corresponding to that of the first member and by the arrest of the second member causing the friction driving clutch to slip without moving the latter member.

33. In a machine including load weighing mechanism; the combination of a control member actuated by the weighing mechanism in response to the load to a load proportional position, a second control member, automatic driving means for moving the second member in one direction to coact with the first member, means other than said members and controlled by coaction of the first with the second member during movement of the latter in said direction for automatically arresting the second member when it reaches said load position, auxiliary mechanism controlled by the second member according to its arrested position, and means for releasing said arresting means from the second member to cause the driving means to resume automatic driving of the second member in the same, aforesaid, direction.

34. In a machine including load weighing mechanism; the combination of a control member actuated by the weighing mechanism in response to the load to a load proportional position, a second control member, automatic driving means for actuating the second member in one direction to coact with the first member, electrical means controlled by the coaction of the first with the second member during movement of the latter in said direction for automatically arresting the second member at said load position, auxiliary mechanism controlled by the second member according to its arrested position, and means for releasing the second member from the arresting means to cause the driving means to automatically resume driving of the second member in the same, aforesaid, direction.

35. In a machine including weighing mechanism; the combination of a member movable by the weighing mechanism in response to the load to a load proportional position, a second member for sensing the load responsive member, a toothed disk, means for moving the second member and the toothed disk, a latch, and means controlled by coaction of the second and first members when the second member during its movement senses the first member for operating the latch to engage the teeth of said disk to arrest movement of the latter.

36. In a machine including load weighing mechanism and auxiliary mechanism; the combination of a control device including a pair of control elements responsive to operation of the weighing mechanism, a sensing device effective while moving in one direction to first sense one of said elements and after completion of the first sensing operation to then sense the other element, means controlled by the later sensing operation for governing operation of the auxiliary mechanism according to the load, and means for rendering the later sensing operation ineffective to control the first-mentioned means unless the first sensing operation has first been effected.

37. In a machine including load weighing mechanism, and auxiliary mechanism; the combination of control means having parts responsive to operation of the weighing mechanism, a sensing device movable in one direction to successively effect preliminary sensing coaction with one part of the control means and advanced sensing coaction with another part of the control means, means controlled by the successive sensing coactions to govern operation of the auxiliary mechanism according to the load, and means for rendering the second-mentioned means ineffective unless both sensing coactions are effected in order.

38. In a machine including load weighing mechanism and auxiliary mechanism; the combination of electrical control means responsive to operation of the weighing mechanism, electrical sensing means effective while moving in one continuous direction from a position remote from and in advance of the control means for effecting in succession preliminary and later sensing coactions with the control means while the latter is stationary, a circuit controlled by the later sensing coaction for governing operation of the auxiliary mechanism according to the load, and a circuit controlled by the preliminary sensing coaction for rendering the first-mentioned circuit effective.

FREDERICK Q. RAST.